United States Patent
Langhorst et al.

(10) Patent No.: US 10,932,335 B2
(45) Date of Patent: Feb. 23, 2021

(54) PAINTED ELECTROLUMINESCENT VEHICLE TRIM COMPONENTS

(71) Applicant: FORD GLOBAL TECHNOLOGIES, LLC, Dearborn, MI (US)

(72) Inventors: Benjamin R. Langhorst, Beverly Hills, MI (US); Jason J. Powell, Ypsilanti, MI (US); Amy E. Langhorst, Ann Arbor, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 104 days.

(21) Appl. No.: 16/439,936

(22) Filed: Jun. 13, 2019

(65) Prior Publication Data

US 2020/0396808 A1    Dec. 17, 2020

(51) Int. Cl.
| | |
|---|---|
| *H05B 33/14* | (2006.01) |
| *C09D 5/22* | (2006.01) |
| *H05B 33/22* | (2006.01) |
| *B60Q 1/00* | (2006.01) |
| *B62D 39/00* | (2006.01) |

(52) U.S. Cl.
CPC ........ *H05B 33/145* (2013.01); *B60Q 1/0088* (2013.01); *C09D 5/22* (2013.01); *H05B 33/22* (2013.01); *B62D 39/00* (2013.01)

(58) Field of Classification Search
CPC ........ H05B 33/145; H05B 33/22; C09D 5/22; B60Q 1/0088
See application file for complete search history.

(56) References Cited

U.S. PATENT DOCUMENTS 8,470,388 B1    6/2013    Zsinko et al.

FOREIGN PATENT DOCUMENTS

| | | |
|---|---|---|
| DE | 102011105190 A1 | 12/2012 |
| GB | 971008 | 9/1964 |

*Primary Examiner* — Joseph L Williams
(74) *Attorney, Agent, or Firm* — Frank L. Lollo; MacMillan, Sobanski & Todd, LLC (57) ABSTRACT

A painted vehicle trim component such as a spoiler, sideview mirror housing, or other vehicle body part is provided with electroluminescent paint to emit light from its surface. The trim component includes a substrate having a mounting surface for attaching to the vehicle. A conductor body is at least partially embedded in the substrate to provide a conductive surface exposed externally of the substrate. A conductive wire is crimped to the conductor body and is adapted to connect to an electrical power source remotely from the vehicle trim component. A conductive bus bar paint layer is deposited over the substrate and onto the exposed conductive surface of the conductor body. A light-emitting paint layer deposited over the substrate is disposed relative to the conductive paint layer such that light is emitted when an electrical signal is received at the conductive wire.

15 Claims, 9 Drawing Sheets

PAINTED ELECTROLUMINESCENT VEHICLE TRIM COMPONENTS

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to vehicle trim components with an electroluminescent paint system, and, more specifically, to a connector system for making electrical contact to a conductive paint layer.

Lighting systems for automotive vehicle applications have conventionally been used to provide general area illumination and/or illumination of specific objects, either for aesthetic or functional reasons. Recently, alternative light sources such as electroluminescent (EL) panels have been adopted for a wide range of vehicle lighting applications. For example, U.S. Pat. No. 4,864,473 to Tokarz et al discloses an electroluminescent panel dome lamp designed for a convertible-type automobile. The panel is mounted on a housing that is attached to the headliner of the vehicle roof. U.S. Pat. No. 5,013,967 to Hirotaka et al discloses a detachable electroluminescent panel light source that can be located at various places about the inside of a vehicle to provide illumination. These locations include the trunk, the glove compartment, and on the backside of the front seats. U.S. Pat. No. 5,564,813 to Curtindale discloses a sun visor that includes incandescent light sources to provide courtesy, reading, and vanity illumination. Curtindale states that electroluminescent lighting strips could be used in place of the incandescent lamps.

Electroluminescent light has also been added to exterior trim components such as a spoiler and a side-view mirror housing. In order to integrate such components with the rest of the vehicle body exterior, they typically utilize smooth outer surfaces which are painted to match or complement the surrounding paint of the body exterior in order to provide a pleasing visual appearance when the electroluminescent lighting function is not activated.

Electroluminescent paint systems provide the ability to emit light from within painted surfaces of objects. Such systems can be used to provide EL lighting for a variety of interior and exterior trim components and accessories of automotive vehicles, as well as many other general articles of manufacture. Certain paint layers within the EL paint system are required to conduct electricity in order to act as a capacitor with a dielectric layer and a phosphor layer between the conductive layers. Electricity is supplied by an inverter and transmitted via wires to the desired painted area, where electrical connections must be made between the wires and the paint layers.

The conductive paint layers have been provided with contact patches for making the electrical connections. Typically, bare wires have been laid on the contact patches and then covered with an epoxy to hold the wire in contact with the paint contact patch. Electrical durability of the connection site can be enhanced by applying a conductive flux (e.g., conductive epoxy) that surrounds the bare wires and bonds to the conductive paint. Conductive epoxy is very expensive, challenging to automate, and increases the complexity of the manufacturing process. Common soldering techniques cannot be used because the paint layer is extremely thin and vulnerable to the intense heat of soldering.

Thus, existing methods to make electrical connections to conductive paint have required inefficient manual operations and/or expensive materials and equipment. It would be desirable to improve the reliability of such connections and to reduce the associated cost and complexity.

SUMMARY OF THE INVENTION

In one aspect of the invention, a vehicle trim component with electroluminescent lighting comprises a substrate having a mounting surface for attaching to a vehicle. A conductor body is at least partially embedded in the substrate having a conductive surface exposed externally of the substrate. A conductive wire is connected to the conductor body and is adapted to connect to an electrical power source remotely from the vehicle trim component. A conductive bus bar paint layer is deposited over the substrate and onto the exposed conductive surface of the conductor body. A light-emitting paint layer deposited over the substrate is disposed relative to the conductive paint layer such that light is emitted when an electrical signal is received at the conductive wire.

DETAILED DESCRIPTION OF PREFERRED EMBODIMENTS

Figure 1:
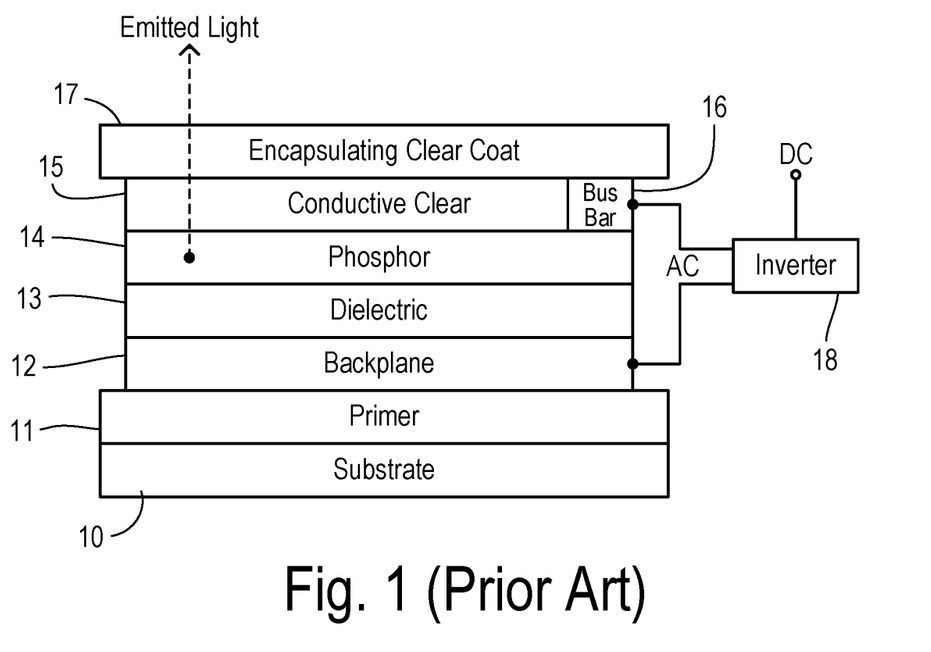
FIG. 1 is a diagram showing the typical layers and other components of an electroluminescent paint system.

FIG. 1 shows typical layers of an electroluminescent paint system according to the structure and manufacturing methods as disclosed in U.S. Pat. No. 8,470,388, to Zsinko et al, which is incorporated herein by reference. A substrate 10 is an outer surface of an article to be coated with an EL lamp, such as a vehicle trim component. An optional primer layer 11 is applied to substrate 10 and provides a surface for applying a conductive backplane layer 12. Backplane layer 12 is formed by depositing a conductive paint on a region of the article were the lamp is to be formed. Backplane layer 12 is covered by a dielectric layer 13 and a phosphor layer 14. A clear conductive layer 15 is applied over phosphor layer 14 and is in contact with a conductive busbar layer 16 deposited along one or more edges. A encapsulating clearcoat layer 17 is applied over layers 15 and 16 to protect and seal the underlying layers and to provide a desired visual appearance. An inverter 18 receives a DC power supply voltage and produces an AC output voltage that is applied across phosphor layer 14 (e.g., by connecting one AC side to busbar layer 16/clear conductive layer 15 and connecting the other AC side to backplane layer 12) to generate electroluminescent light as known in the art.

Figure 2:
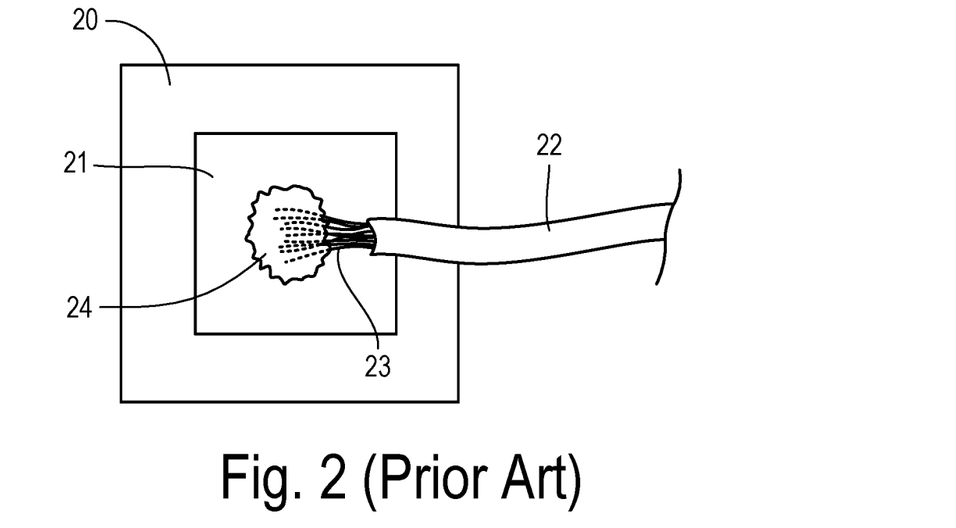
FIG. 2 is a plan view showing a conventional method of connecting a bare wire to a contact patch.

A typical prior art connection to a conductive paint layer is shown in FIG. 2 wherein a painted EL lamp system 20 applied to an article has an exposed conductive patch 21 (which may include either a portion of a backplane layer or a busbar layer). A wire 22 has exposed conductive braids 23 which are laid against conductive patch 21 and then held in place by applying a conductive epoxy or other adhesive 24. Such a connection method is complex, costly, and has limited strength.

Figure 3:
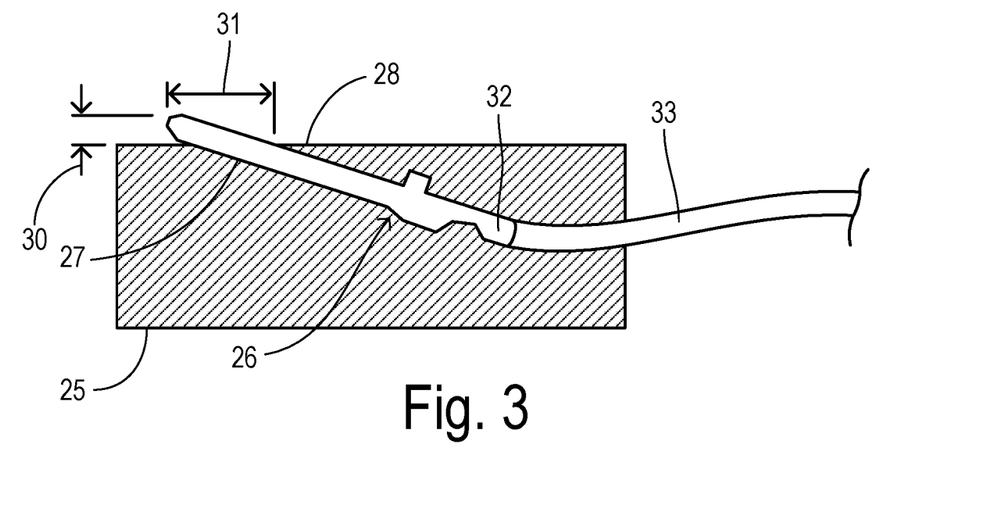
FIG. 3 is a side cross-sectional view of a substrate of the present invention incorporating a conductor body for making electrical contact with a conductive paint layer.

An improved connection method of the invention utilizes a conductor body at least partially embedded within a molded substrate as shown in FIG. 3. Thus, a plastic molded substrate 25 (e.g., a vehicle trim component for attaching to a motor vehicle) has a conductor body 26 at least partially embedded so that a conductive surface 27 is externally exposed at one end. Conductor body 26 may be slanted with respect to an outer edge 28 of substrate 25, whereby externally exposed surface 27 extends above outer edge 28 of substrate 25 by a height 30. Thus, an exposed paintable surface 31 is arranged to receive a conductive paint layer and has a predetermined length sufficient to provide a surface area that provides desirable electrical properties. Conductor body 26 may preferably be comprised of a conventional metal spade of a type used in plug-in connectors, wherein a pin end forms conductive surface 27 and a crimping end 32 is crimped over an exposed end portion of a wire 33. By applying a conductive paint layer (e.g., either a backplane layer or a busbar layer) that extends over the substrate and the exposed conductor body, a simple and robust connection is provided between the conductive paint layer and a signal wire.

Figure 4:
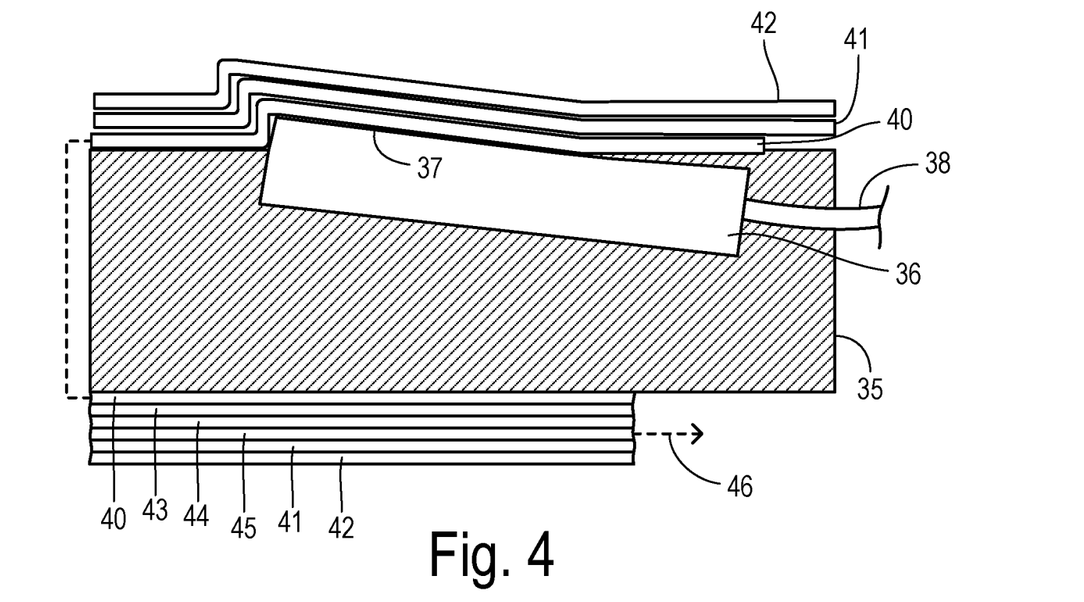
FIG. 4 is a side cross-sectional view showing a trim component of the invention with electroluminescent lighting in greater detail.

The invention is shown in greater detail in FIG. 4 wherein a substrate 35 embeds a conductor body 36 with an exposed surface 37 and a connection to a signal wire 38. A conductive backplane layer 40 is applied over substrate 35 and extends over conductor body 37 for making direct electrical contact to layer 40 via body 36 at a connection region of the article. Layer 40 extends from the connection region across an outer surface of substrate 35 into a lamp region of substrate 35 (i.e., where EL light is to be produced). Commonly, the article may have a mounting surface for attachment to a vehicle and a show surface which is visible after installation. The show surface can be configured to produce EL light over the full exposed surface or from only selected areas according to desired patterns or styling. The EL lamp region(s) may be placed on any other coextensive painted surface of substrate 35 including the same side as the connection region or on an opposing side as shown in FIG. 4 (wherein backplane layer 40 is shown extending onto an opposing side of substrate 35).

At the connection region, conductive layer 40 receives a standard base coat layer 41 and a standard clearcoat layer 42 to insulate, seal, and protect conductive layer 40 while providing a consistent visual appearance of the finished article between the connection region and the surrounding areas. At the lamp region, conductive layer 40 is preferably covered by a dielectric layer 43, phosphor layer 44, and clear conductive layer 45. Clear conductive layer 45 is further connected at 46 to a second signal line via a busbar layer (not shown). Clear conductive layer 45 is then covered by extensions of color base coat layer 41 and standard clearcoat layer 42.

A plastic substrate and embedded conductor body of the invention can be fabricated using injection molding or blow molding (e.g., extrusion blow molding, injection blow molding, or injection stretch blow molding), for example. Substrate materials can include high or low density polyethylene, polypropylene, co-polyester, PET, PVC, nylon, EVOH, EVA, TPE, COP, COC, polycarbonate, polystyrene, ABS, and other plastics. The conductor body may include a connector terminal made of copper, tin-plated copper, brass, nickel-plated steel, or other metal or conductive materials.

Figure 5:
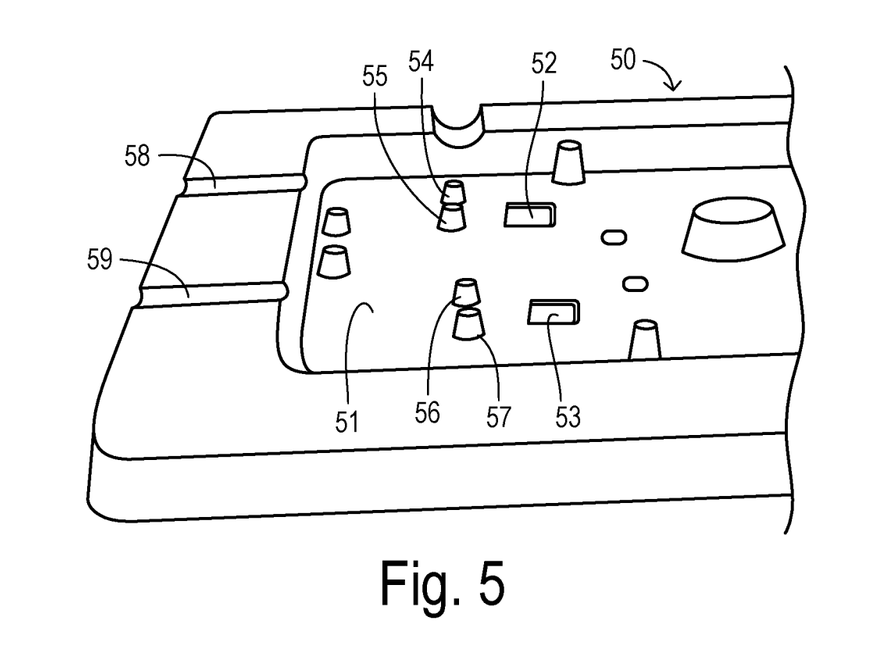
FIG. 5 is a perspective view of a portion of an empty mold for embedding a conductor body into a substrate according to one embodiment of the invention.

FIG. 5 shows a lower portion of a die 50 for fabricating a device according to one embodiment of the present invention using blow molding or injection molding. A lower surface 51 of die 50 includes a pair of sloped cavities 52 and 53 that are arranged to receive the ends of conductor bodies which will be exposed after molding. A pair of side-by-side posts 54 and 55 provide a connector-retention feature for holding a conductor body such as a metal spade in proper alignment with the end of the spade retained within cavity 52. Likewise, posts 56 and 57 provide a connector-retention feature associated with cavity 53. A pair of grooves 58 and 59 are provided for receiving insulated wires which have their ends crimped to the connector bodies prior to being inserted into the mold.

Figure 6:
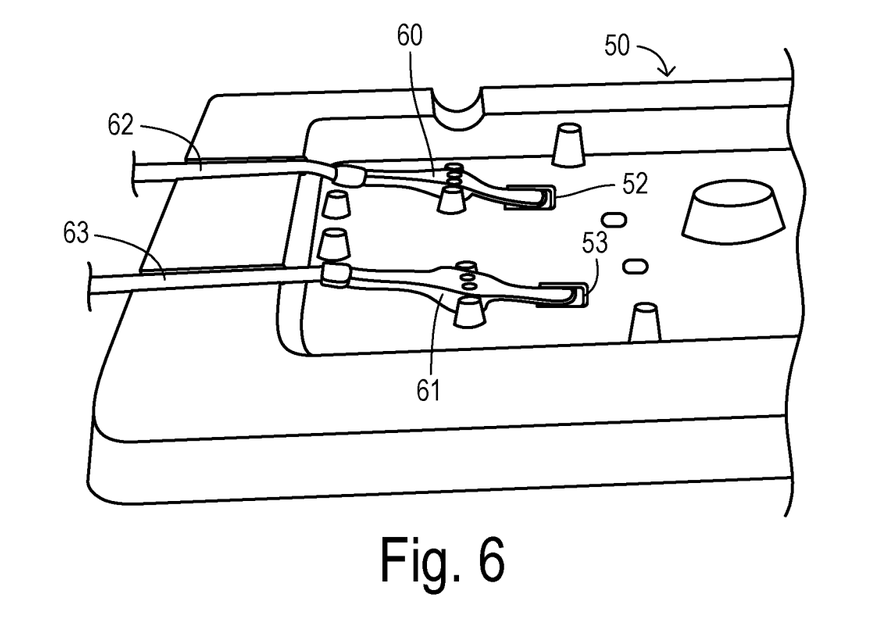
FIG. 6 is a perspective view of the mold of FIG. 5 after loading with a pair of conductor bodies in preparation for molding of the substrate.
Figure 7:
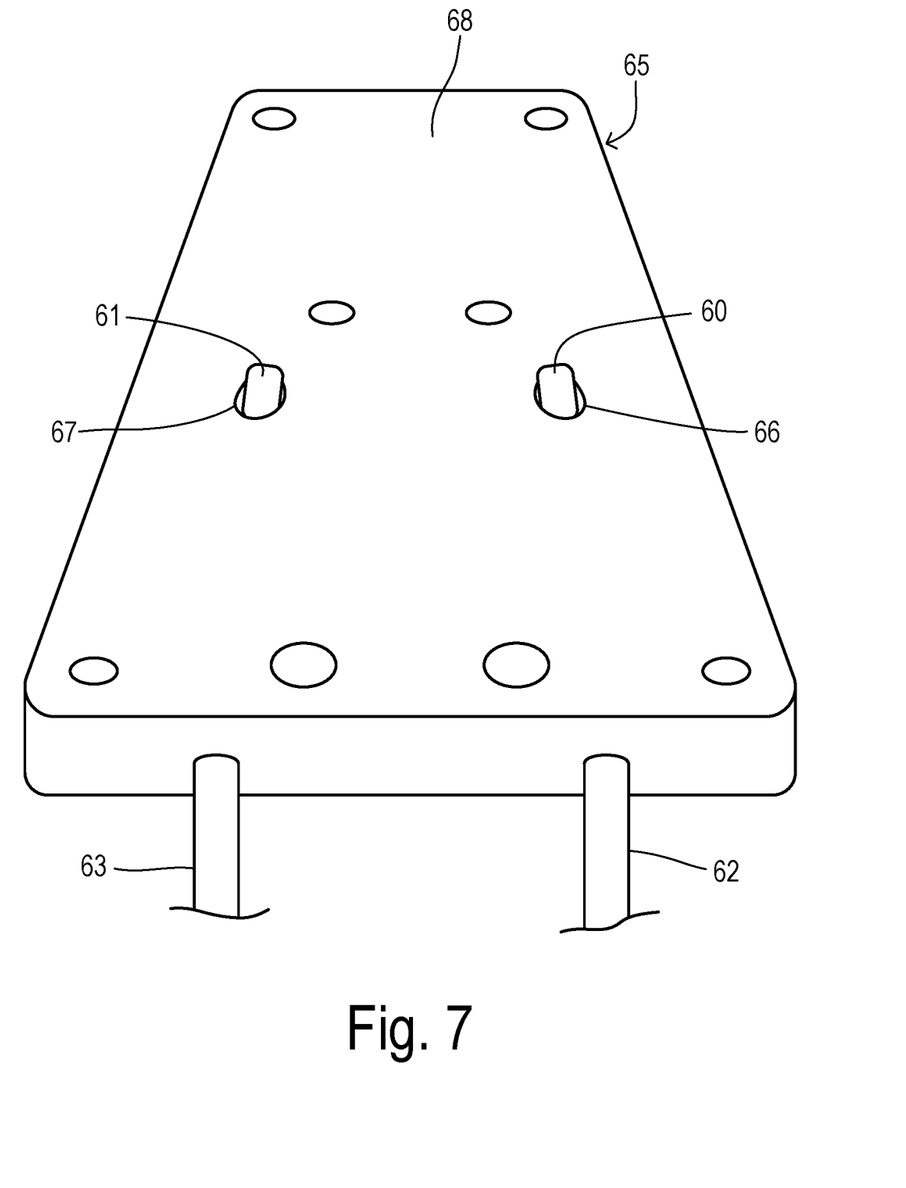
FIG. 7 is a bottom, perspective view of a molded substrate obtained after introducing moldable plastic into the mold of FIG. 6.

FIG. 6 shows die 50 with conductor bodies 60 and 61 loaded into the connector-retention features so that their ends are held within cavities 52 and 53. Wires 62 and 63 (crimped onto conductor bodies 60 and 61) are placed in the corresponding grooves before the placement of an upper die portion (not shown) that defines the remaining surfaces of the final substrate shape. A parison is inserted into the mold and then expanded against conductor bodies 60 and 61 and the sides of the dies in order to produce the molded substrate 65 as shown in FIG. 7. Substrate 65 has openings 66 and 67 within a mounting surface 68 where conductive surfaces of conductor bodies 60 and 61 are exposed. Other features in mounting surface 68 may be provided for receiving fasteners or other installation hardware to attach a vehicle trim component to a vehicle, for example.

Figure 8:
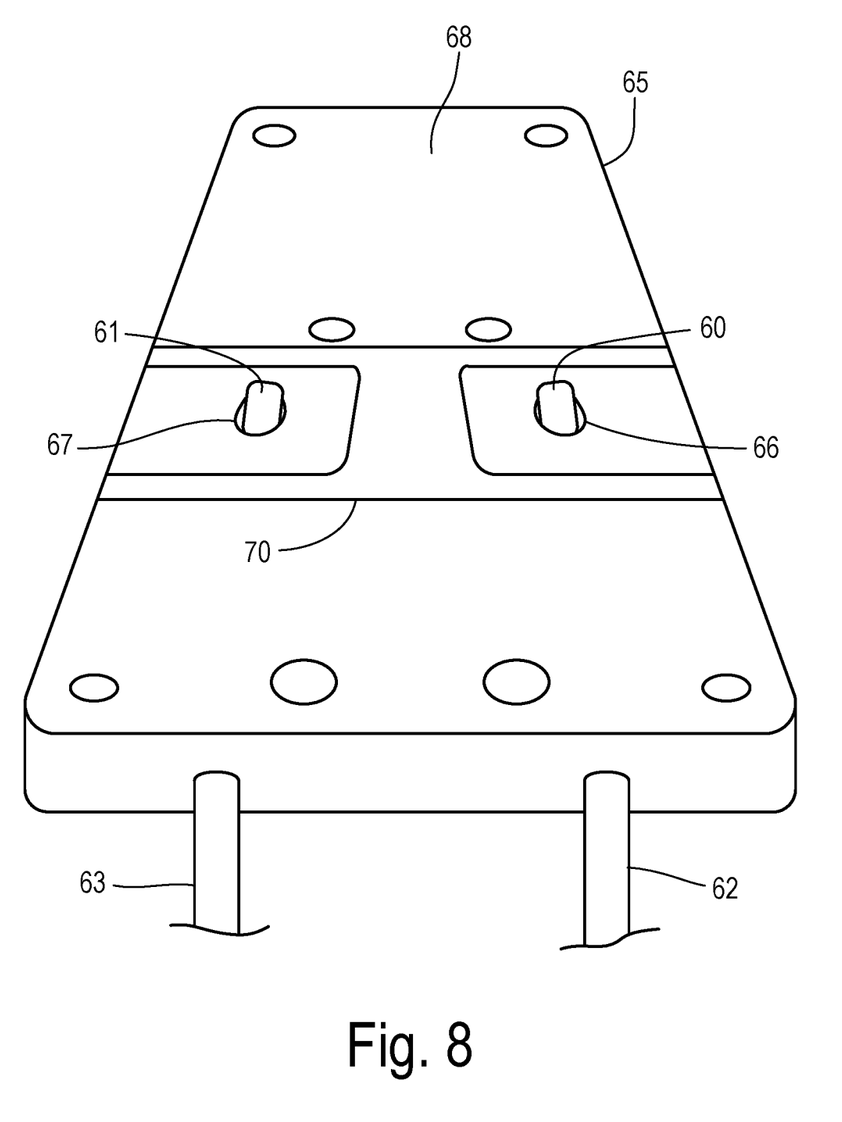
FIG. 8 is a bottom, perspective view of the substrate of FIG. 7 after being masked in preparation for the application of conductive paint layers.
Figure 9:
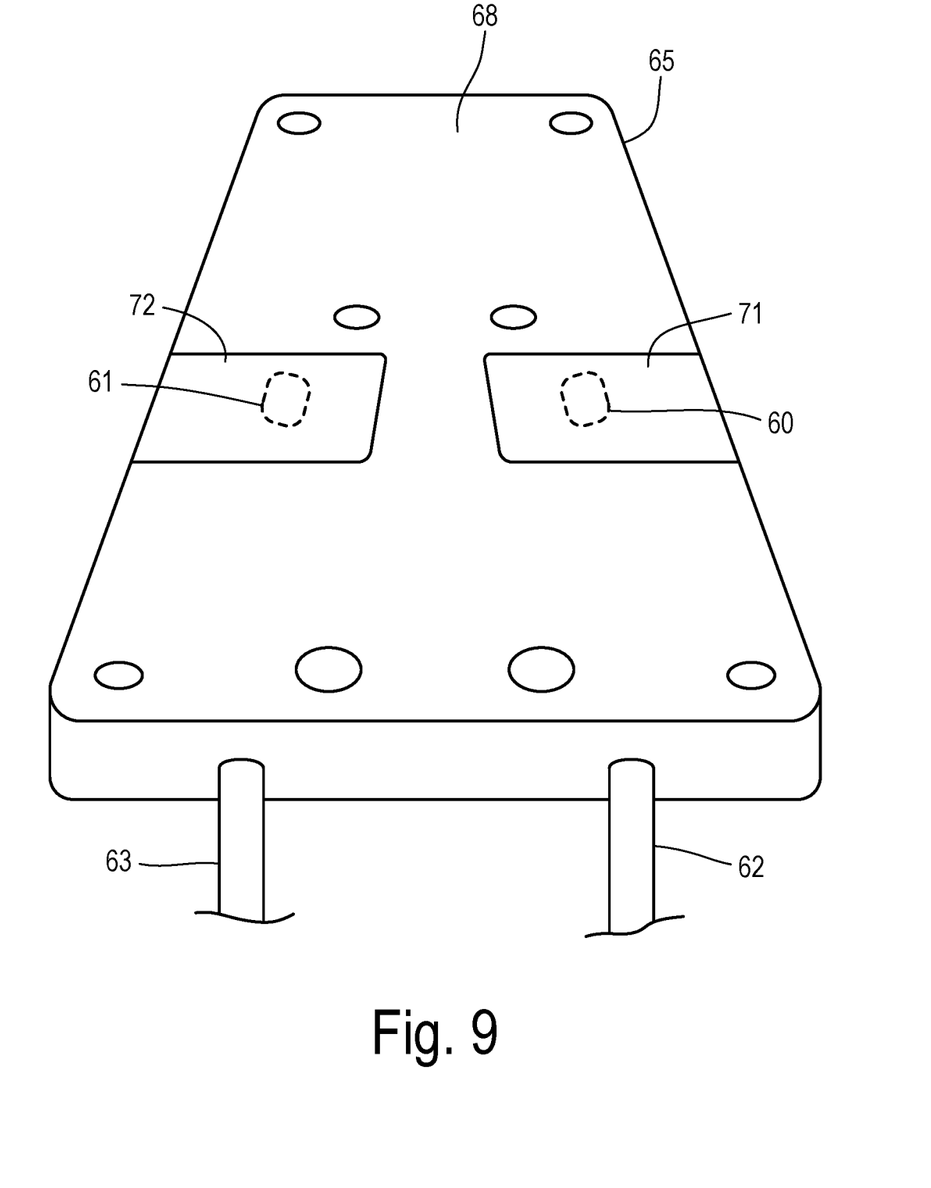
FIG. 9 is a bottom, perspective view of the substrate of FIG. 8 after application of the conductive paint layers.

In preparation for receiving a conductive busbar paint layer, selected areas around openings 66 and 67 are masked as shown in FIG. 8. A masking film or tape 70 is applied to surface 68 in order to isolate conductive regions associated with conductor bodies 60 and 61 after removal of masking film 70. After masking, the conductive paint layer is deposited over corresponding sections of surface 68 and preferably extending over other surfaces or sides of substrate 65 according to the desired paths or areas where needed to produce the desired areas of EL lighting. After removing the masking film, conductive busbar paint layers 71 and 72 are separately provided on surface 68 as shown in FIG. 9. Layers 71 and 72 respectively make electrical contact with conductor bodies 60 and 61. Each conductive paint layer preferably extends to another surface (e.g., show surface) to form an EL lamp system with other paint layers including dielectric, phosphor, clear conductive, base color, and clearcoat layers as needed.

Figure 10:
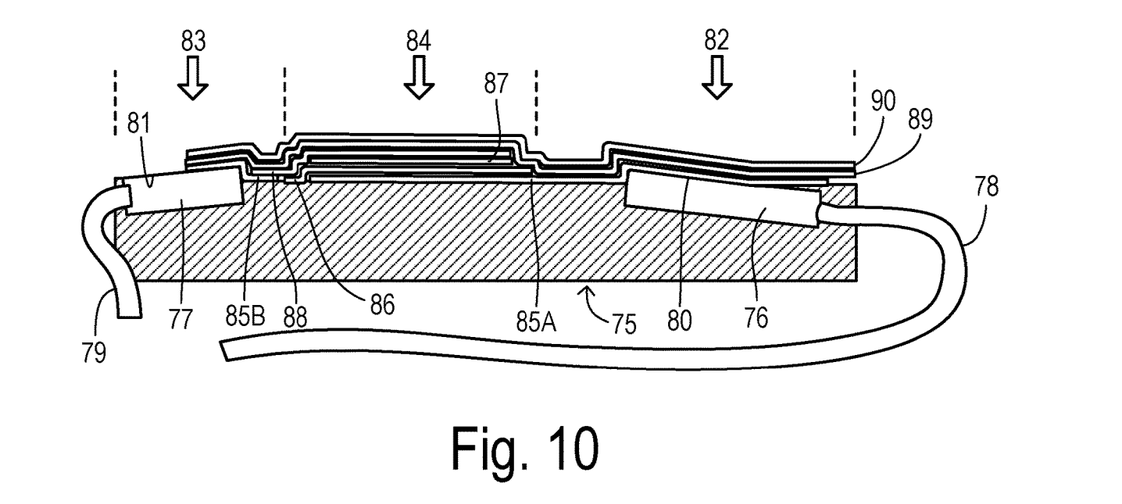
FIG. 10 is a side, cross-sectional view of another embodiment of a trim component with electroluminescent lighting.

FIG. 10 shows another embodiment of the invention wherein connector regions and active lamp regions are on a same side (i.e., the "show" side) of a substrate 75. Substrate 75 embeds conductor bodies 76 and 77 with conductive wires 78 and 79 for connecting with an AC power supply (not shown). A top surface of substrate 75 exposes conductive surfaces 80 and 81 of conductor bodies 76 and 77. Conductor bodies 76 and 77 define connector regions 82 and 83, and a plurality of paint layers are deposited to define active lamp region 84.

Conductive paint layers 85A and 85B are deposited in contact with conductive surfaces 80 and 81, respectively. Layer 85A is arranged to act as a backplane layer, and layer 85B is arranged to act as a conductive bus bar layer to contact a clear conductive layer 88. A dielectric (insulation) layer 86 is deposited over backplane layer 85A and receives a phosphor layer 87 to define active lamp region 84. Clear conductive layer 88 is in contact with bus bar layer 85B and overlies phosphor layer 87. For finishing the article, a standard color base coat layer 89 and a standard clearcoat paint layer 90 are applied to seal and protect the other painted layers and to provide a desired visual appearance.

Figure 11:
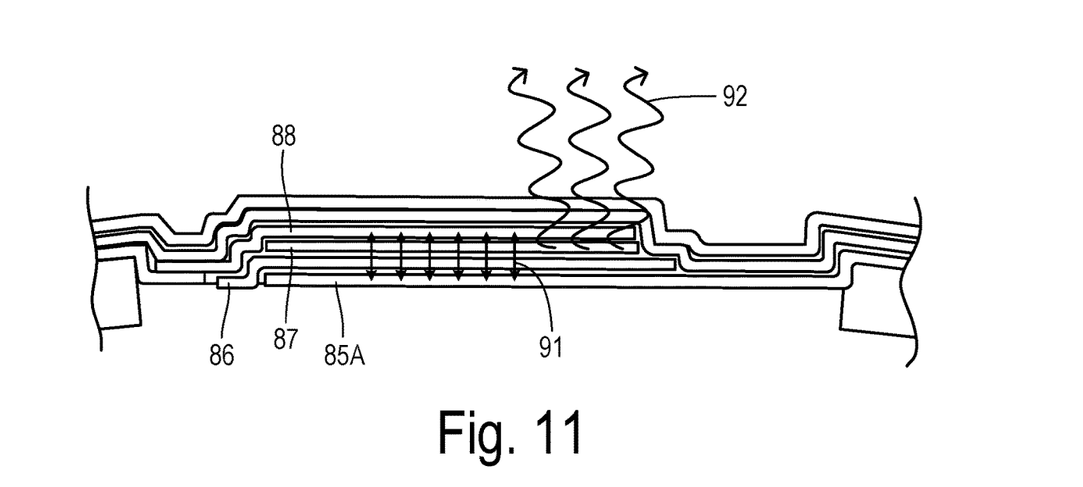
FIG. 11 is a side, cross-sectional view showing a portion of the trim component of FIG. 10 and showing the emission of light.

FIG. 11 shows an electric field 91 which is generated between the backplane layer 85B and clear conductive layer 88 when an AC voltage is applied to conductor bodies 80 and 81. In the presence of the alternating electric field, electroluminescent light 92 is emitted from phosphor layer 87.

Figure 12:
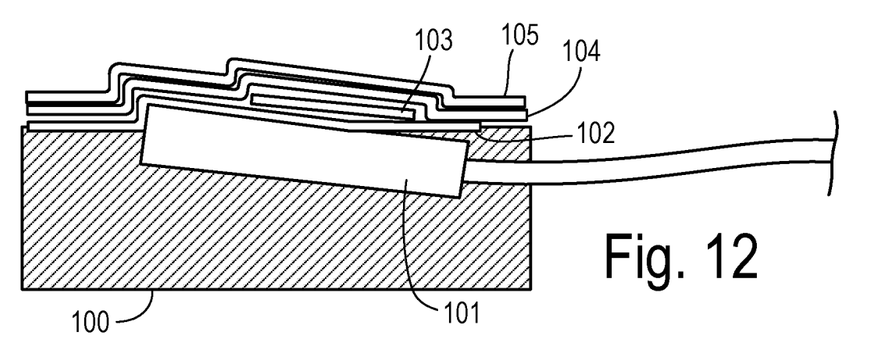
FIG. 12 is a side, cross-sectional view of another embodiment of a trim component wherein a layer of reinforcing conductive paint is applied.

FIG. 12 shows an alternative embodiment wherein a substrate 100 has an embedded conductor body 101 providing a slanted conductive surface for receiving a conductive bus bar layer 102. In order to provide electrical reinforcement, an additional conductive body 103 is deposited or otherwise applied between bus bar layer 102 and a standard color base coat layer 104, which in turn is covered by a standard clearcoat layer 105. Reinforcement conductive body 103 may be comprised of additional thicknesses of conductive paint, an electrically conductive epoxy, or an electrically conductive tape. The increased thickness of electrical reinforcement body 103 provides increased adhesion, strength, and electrical continuity.

Figure 13:
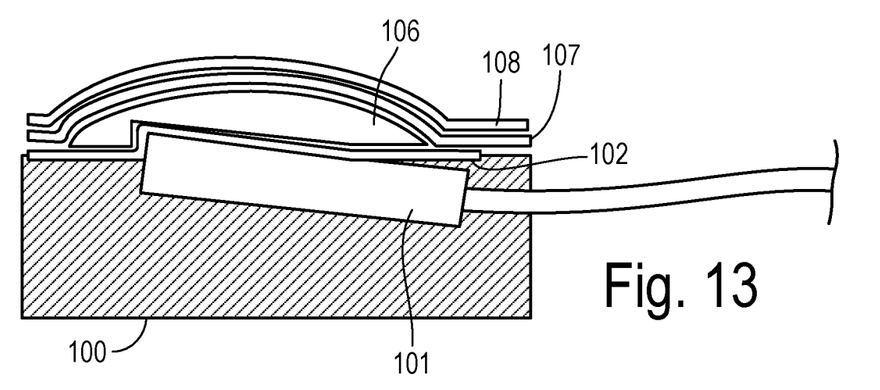
FIG. 13 is a side, cross-sectional view of another embodiment of a trim component wherein an adhesive body is applied over a conductive paint layer.

Various embodiments of the invention may result in a jagged appearance at connector region as a result of the slanted conductive surface of the conductor body, the edges of various painted layers, and/or the presence of reinforcement using thickened paint or conductive tape. FIG. 13 shows an alternative embodiment to lessen a jagged appearance and provide a smoother surface. Thus, slanted conductive body 101 and conductive bus bar layer 102 are covered by a smoothing body 106 made using a shapeable material which can be either conductive or non-conductive. For example, smoothing body 106 may be comprised of an epoxy applied with a rounded outer surface. After application of a standard color base coat layer 107 and a standard clearcoat layer 108, the connector region has a dome-like appearance with smooth transitions and without jagged edges.

Figure 14:
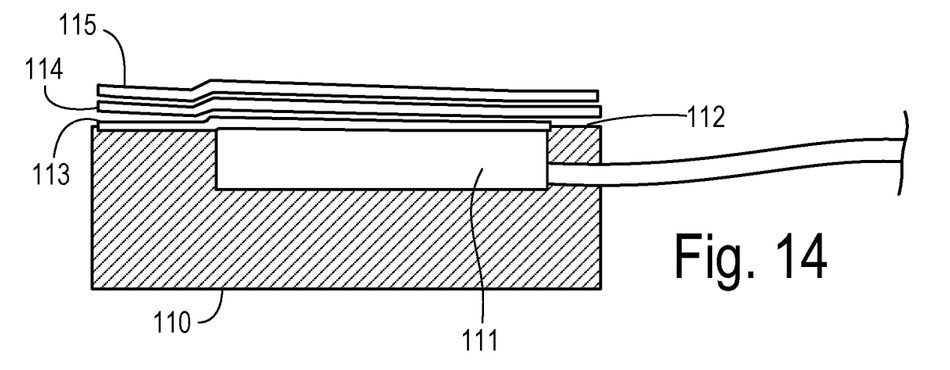
FIG. 14 is a side, cross-sectional view of another embodiment of a trim component wherein a conductor body is substantially flush to a surface of the substrate.

To further enhance a smooth appearance, FIG. 14 shows an alternative embodiment wherein a substrate 110 embeds a conductor body 111 such that a conductive surface of body 11 is substantially aligned with an upper edge 112 of substrate 110. Embedding conductor body 111 such that it is substantially flush to surface 112 requires tighter tolerances in the molding process, but will be feasible for many different types of molded articles. A conductive bus bar layer 113 extends over surface 112 and the upper side of conductor body 111, and the article is then covered with a standard color base coat layer 114 and a standard clearcoat layer 115.

Figure 15:
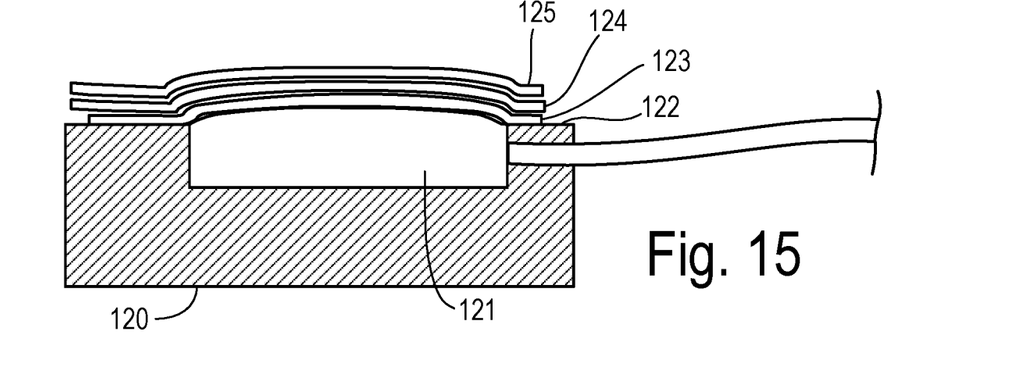
FIG. 15 is a side, cross-sectional view of another embodiment of a trim component wherein a conductor body has a bulging profile.

To reduce tolerancing requirements for the molding process while maintaining an orientation of a conductor body that is generally parallel to a surface of the substrate, an embodiment as shown in FIG. 15 wherein the substrate 120 embeds a conductor body 121 having a bulging upper surface that rises slightly above an upper surface 122 of substrate 120. The bulging surface allows robust contact with conductive bus bar layer 123. After bus bar layer 123 is covered by standard color base coat layer 124 and standard clearcoat layer 125, a non-jagged appearance is maintained.

Figure 16:
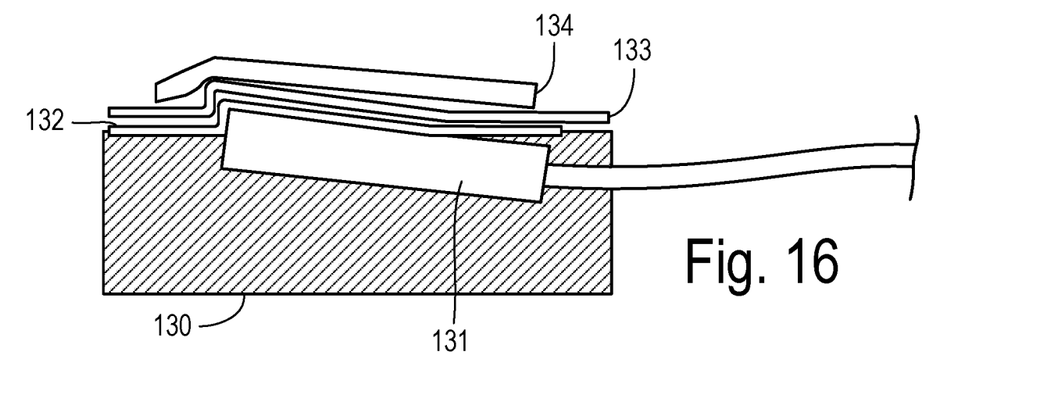
FIG. 16 is a side, cross-sectional view of another embodiment of a trim component wherein a mastic tape layer is disposed over a conductive paint layer.
Figure 17:
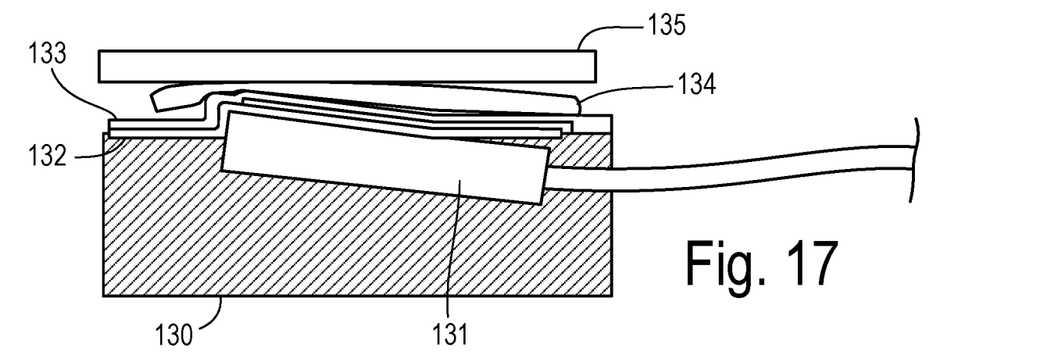
FIG. 17 is a side, cross-sectional view of another embodiment of a trim component wherein a mastic tape layer and a cover plate are disposed over a conductive paint layer.

For protection in harsher environments, additional reinforcement can be applied after painting of all the painted layers. FIG. 16 shows an embodiment wherein a substrate 130 embeds a conductor body 131 with a slanted conductive surface receiving a bus bar paint layer 132. After applying (and curing of) a standard color layer and/or clearcoat layer 133, a protective adhesive body 134 is applied over the connector region. Adhesive body 134 may be comprised of a mastic tape or patch (e.g., Scotch Seal tape 2229 available from 3M Company) or additional layers of epoxy. For additional abrasion resistance, a shielding plate 135 may be further installed over adhesive body 134 as shown in FIG. 17. Shielding plate 135 may be held in place with fasteners (not shown) or can be held in place by adhesive body 134.

What is claimed is:

1. A vehicle trim component with electroluminescent lighting, comprising:
   a substrate having a mounting surface for attaching to a vehicle;
   a conductor body at least partially embedded in the substrate and having a conductive surface exposed externally of the substrate;
   a conductive wire connected to the conductor body and adapted to connect to an electrical power source remotely from the vehicle trim component;
   a conductive bus bar paint layer deposited over the substrate and onto the exposed conductive surface of the conductor body; and
   a light-emitting paint layer deposited over the substrate and disposed relative to the conductive paint layer such that light is emitted when an electrical signal is received at the conductive wire.

2. The vehicle trim component of claim 1 wherein the substrate is comprised of molded plastic.

3. The vehicle trim component of claim 2 wherein the molded plastic substrate is blow molded onto the conductor body.

4. The vehicle trim component of claim 2 wherein the molded plastic substrate is injection molded onto the conductor body.

5. The vehicle trim component of claim 1 wherein the conductive surface of the conductor body is slanted with respect to an outer surface of the substrate so that the conductive surface projects outwardly from the substrate.

6. The vehicle trim component of claim 1 wherein the conductor body is comprised of a metal spade with a crimped end holding the conductive wire.

7. The vehicle trim component of claim 1 comprising at least two conductor bodies and at least two conductive paint layers separately deposited on the conductor bodies for applying an alternating electric field across the light-emitting paint layer.

8. The vehicle trim component of claim 7 further comprising a conductive clear paint layer in contact with the conductive bus bar paint layer.

9. The vehicle trim component of claim 1 wherein the substrate has a show surface opposing the mounting surface, and wherein the conductive surface of the conductor body is exposed within the mounting surface.

10. The vehicle trim component of claim 1 further comprising a protective adhesive body disposed over the conductive bus bar paint layer.

11. The vehicle trim component of claim 10 wherein the protective adhesive body is comprised of a mastic tape.

12. The vehicle trim component of claim 1 further comprising a shielding plate disposed over the conductive bus bar paint layer.

13. A painted article with electroluminescent lighting, comprising:
    a plastic molded substrate having a show surface and a connection surface;
    first and second conductor bodies at least partially embedded in the substrate and having first and second conductive surfaces exposed externally at the connection surface;
    first and second conductive wires each connected to a respective conductor body within the substrate and extending from the substrate to connect to an electrical power source;
    a conductive backplane paint layer deposited over the show surface and onto the exposed first conductive surface of the first conductor body;
    a conductive bus bar paint layer deposited over the substrate and onto the exposed second conductive surface of the second conductor body;
    a conductive clear paint layer deposited over the show surface and contacting the conductive bus bar paint layer; and
    a light-emitting paint layer deposited over the show surface and disposed between the conductive backplane paint layer and the conductive clear paint layer such that light is emitted when an electrical signal is received at the first and second conductive wires.

14. The article of claim 13 wherein the first and second conductive surfaces are slanted with respect to an outer surface of the substrate so that the first and second conductive surfaces project outwardly from the substrate.

15. The article of claim 13 wherein the first and second conductor bodies are each comprised of a metal spade with a crimped end holding a respective conductive wire.

\* \* \* \* \*